(12) United States Patent
Ueda

(10) Patent No.: US 7,819,141 B1
(45) Date of Patent: Oct. 26, 2010

(54) INDUSTRIAL TWO-LAYER FABRIC

(75) Inventor: Ikuo Ueda, Shizuoka (JP)

(73) Assignee: Nippon Filcon Co., Ltd., Tokyo (JP)

( * ) Notice: Subject to any disclaimer, the term of this patent is extended or adjusted under 35 U.S.C. 154(b) by 0 days.

(21) Appl. No.: 12/591,704

(22) Filed: Nov. 30, 2009

(30) Foreign Application Priority Data

Nov. 28, 2008 (JP) ............... 2008-303909

(51) Int. Cl.
D03D 3/04 (2006.01)
D21F 7/08 (2006.01)
D03D 25/00 (2006.01)
(52) U.S. Cl. ................. 139/383 A; 139/383 AA; 139/383 R; 162/358.2
(58) Field of Classification Search ............ 139/383 R, 139/383 A, 383 AA, 408, 411, 412, 413, 139/414; 162/348, 358.1, 358.2, 900, 902, 162/903, 904
See application file for complete search history.

(56) References Cited

U.S. PATENT DOCUMENTS

| | | | | |
|---|---|---|---|---|
| 4,408,637 A * | 10/1983 | Karm | ............ | 139/425 A |
| 4,438,788 A * | 3/1984 | Harwood | ............ | 139/383 AA |
| 4,821,780 A * | 4/1989 | Tate | ............ | 139/383 A |
| 5,025,839 A | 6/1991 | Wright | | |
| 5,152,326 A * | 10/1992 | Vohringer | ............ | 139/383 A |
| 5,544,678 A * | 8/1996 | Barrett | ............ | 139/383 A |
| 5,632,310 A * | 5/1997 | Yasuoka | ............ | 139/383 A |
| 5,641,001 A | 6/1997 | Wilson | | |
| 5,826,627 A * | 10/1998 | Seabrook et al. | ............ | 139/383 A |
| 5,829,489 A * | 11/1998 | Kuji | ............ | 139/383 A |
| 5,937,914 A | 8/1999 | Wilson | | |
| 6,000,440 A | 12/1999 | Hay | | |
| 6,354,335 B1 * | 3/2002 | Taipale et al. | ............ | 139/383 A |
| 6,581,645 B1 * | 6/2003 | Johnson et al. | ............ | 139/383 A |
| 6,810,917 B2 * | 11/2004 | Stone | ............ | 139/383 A |
| 7,108,019 B2 * | 9/2006 | Nagura et al. | ............ | 139/383 A |

(Continued)

FOREIGN PATENT DOCUMENTS

EP 1195462 A2 4/2002

(Continued)

OTHER PUBLICATIONS

European extended search report for EP Application No. 09252679.7, dated Feb. 25, 2010.

*Primary Examiner*—Bobby H Muromoto, Jr.
(74) *Attorney, Agent, or Firm*—Rader, Fishman & Grauer PLLC

(57) ABSTRACT

A two layer fabric has first, second, third and fourth upper side wefts contiguously and repeatedly arranged. Each of three contiguously arranged warps forms a knuckle over second, over third, and over second upper side wefts respectively to form a separation portion. At both sides of the separation portion, both the second and third upper side wefts form a float portion by passing over two or more warps. Adjacent to the float portion, one warp passes over the second and third upper side wefts successively and one or two warps adjacent thereto pass over the second or the third upper side weft to form an approach portion where the second and third upper side wefts approach. Crimp portions are formed to sandwich the separation portion where the first and fourth upper side wefts pass over warps which are common to those of the separation portion.

5 Claims, 4 Drawing Sheets

U.S. PATENT DOCUMENTS

| | | | |
|---|---|---|---|
| 7,216,677 B2 * | 5/2007 | Fujisawa | 139/383 A |
| 7,270,151 B2 * | 9/2007 | Nagura et al. | 139/383 A |
| 7,270,152 B2 * | 9/2007 | Ueda et al. | 139/383 A |
| 7,306,014 B2 * | 12/2007 | Nagura et al. | 139/383 A |
| 7,343,938 B2 * | 3/2008 | Takimoto | 139/383 A |
| 7,357,156 B2 * | 4/2008 | Ueda et al. | 139/383 A |
| 7,412,991 B2 * | 8/2008 | Takimoto et al. | 139/383 A |
| 7,426,943 B2 * | 9/2008 | Ueda et al. | 139/383 A |
| 7,464,731 B2 * | 12/2008 | Fujisawa | 139/383 A |
| 2003/0217782 A1 * | 11/2003 | Nagura et al. | 139/383 A |
| 2006/0040578 A1 * | 2/2006 | Nagura et al. | 442/239 |
| 2006/0102244 A1 * | 5/2006 | Ueda et al. | 139/383 A |
| 2006/0112999 A1 * | 6/2006 | Nagura et al. | 139/383 A |
| 2006/0116042 A1 * | 6/2006 | Nagura et al. | 442/205 |
| 2006/0260708 A1 * | 11/2006 | Ueda et al. | 139/383 A |
| 2006/0278295 A1 * | 12/2006 | Ueda et al. | 139/383 A |
| 2007/0095416 A1 * | 5/2007 | Ueda | 139/383 A |
| 2007/0095417 A1 * | 5/2007 | Fujisawa | 139/383 A |

FOREIGN PATENT DOCUMENTS

WO    WO-97/24488 A1    7/1997

* cited by examiner

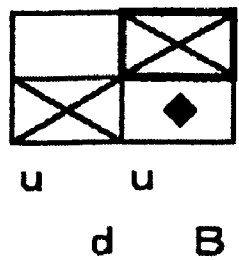 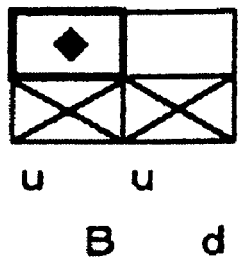 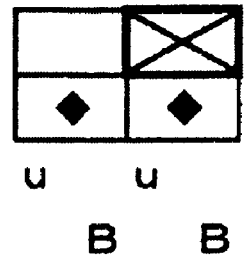
FIG. 6A  FIG. 6B  FIG. 6C
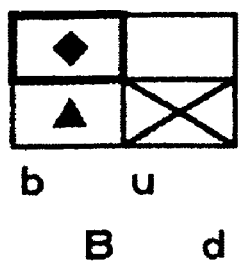 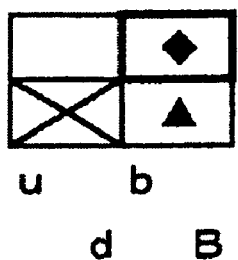 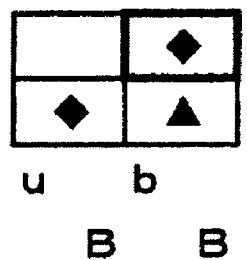
FIG. 6D  FIG. 6E  FIG. 6F
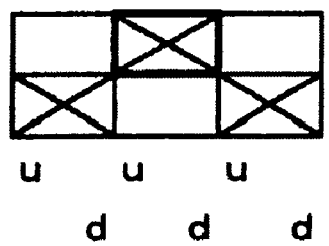 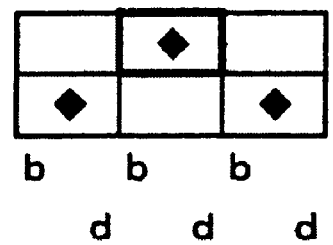
FIG. 6G  FIG. 6H
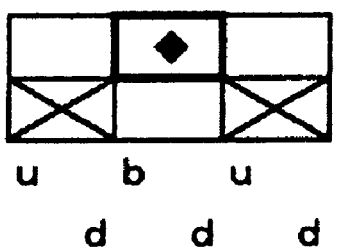 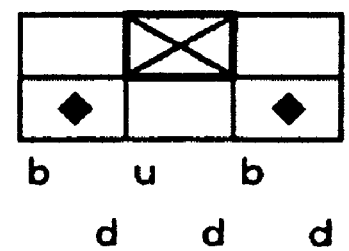
FIG. 6I  FIG. 6J

INDUSTRIAL TWO-LAYER FABRIC

CROSS-REFERENCES TO RELATED APPLICATION

This application claims priority from Japanese Patent Application Serial No. 2008-303909 filed Nov. 28, 2008, the contents of which are incorporated herein by reference in its entirety.

BACKGROUND OF THE INVENTION

1. Field of the Invention

The present invention relates to an industrial two-layer fabric suited for use in the manufacture of paper or nonwoven fabric requiring a uniform water drainage property, dehydration property, breathability, supporting property of articles to be conveyed, and the like.

2. Description of the Related Art

Fabrics made by weaving warps and wefts are used widely for industrial fabrics and, for example, papermaking fabrics, conveying belts, and filter cloths. They are required to have fabric properties suited for using purposes or using environments. Requirements for papermaking fabrics used in a papermaking water removal step from raw materials by utilizing meshes of the fabrics are especially strict.

Such fabrics are required to have, for example, excellent surface smoothness so as not to easily transfer the fabric's wire mark to the supported paper, a dehydration property to enable complete and uniform removal of excess water contained in the raw materials, sufficient rigidity and wear resistance to enable suitable use of the fabric even under severe environments, and a capacity to retain conditions necessary for making excellent paper for a long period of time. Fabrics are also required to have a fiber supporting property, capacity to improve a papermaking yield, size stability, traveling stability, and the like. The demand for papermaking fabrics has become severer with a recent increase in the speed of papering machines.

Among industrial fabrics, papermaking fabrics must satisfy the most severe requirements so that a description of them will promote understanding of the requirements for most of the industrial fabrics and solutions thereof. Therefore, the papermaking fabrics will hereinafter be described as one example.

With a recent increase in the speed of the papermaking machine, industrial fabrics are required to have a particularly excellent dehydration property and surface smoothness. Although necessary dehydration characteristics differ, depending on the machine or product to be manufactured using the fabric, a dehydration property and fiber supporting property are essential conditions for any product. With recent increased use of waste paper containing many minute fibers, much importance has been given to the fiber supporting property. In addition, the fabrics are required to have an excellent dehydration property because sheet formation using minute fibers leads to deterioration in dehydration property.

In papermaking fabrics, it is the common practice to carry out centrifugation, press dehydration and the like by making use of meshes of the fabrics. In order to achieve sufficient water dehydration, suction dehydration from the backside surface of the meshes is also carried out. Necessary characteristics such as fiber supporting property and dehydration property have a great influence on the operation efficiency and running cost.

Papermaking raw materials are supplied onto a wire running from a head box so that fibers tend to be oriented in a machine direction. In order to improve the fiber supporting property, it is recommended to form a fabric having a fine surface and a weft long crimp structure. This is because if fibers oriented in a machine direction are received by a warp long crimp structure, the fibers tend to drop off between warps.

U.S. Pat. No. 5,641,001 discloses a fabric for satisfying both requirements, that is, the fiber supporting property and dehydration property.

This fabric has an additional weft of a small diameter between wefts. FIG. 8 of U.S. Pat. No. 5,641,001 shows a plan view of the surface of the fabric in which additional wefts that extend in a cross oblique direction are arranged. Since additional wefts of a small diameter are placed between wefts, the fabric is excellent in surface smoothness, fiber supporting property, and dehydration property.

SUMMARY OF THE INVENTION

The fabric has, however, portions where mesh spaces are ensured and also portions where wefts and additional wefts approach to each other. Such portions where yarns approach each other cannot provide sufficient dehydration, leading to uneven thickness of paper.

An object of the present invention is to provide an industrial two-layer fabric having a sufficient and uniform dehydration property and therefore capable of overcoming a partial dehydration shortage and at the same time, having an excellent fiber supporting property and surface smoothness.

One of the greatest characteristics of the industrial multilayer fabric of the invention is that the fabric has alternately, in a cross direction, a portion where two adjacent wefts separate from each other and a portion where they approach each other. Even at the portion where yarns approach each other, a three-dimensional space (dehydration space) is formed in an oblique direction due to a height difference between warps and wefts. This enables to increase the shooting count of wefts so that the resulting fabric has improved surface property and fiber supporting property.

With a view to overcoming the above problem, the present inventors have adopted the following constitutions.

There is provided an industrial two-layer fabric having upper side warps to be woven with upper side wefts, lower side warps to be woven with lower side wefts, and binding yarns for weaving an upper layer and a lower layer, wherein:

a first upper side weft, a second upper side weft, a third upper side weft, and a fourth upper side weft are arranged contiguously;

three contiguously arranged warps form knuckles corresponding to one weft over the second upper side weft, the third upper side weft, and the second upper side weft, respectively to constitute a separation portion in which the second upper side weft is separated from the third upper side weft;

on both sides of the separation portion, the second upper side weft and the third upper side weft form floating portions passing over two or more upper side warps or warp binding yarns, respectively;

adjacent to and between the two floating portions, one warp passes over the second upper side weft and the third upper side weft successively and one or two warps on one side or both sides thereof pass over either one of the second upper side weft or the third upper side weft to form an approach portion in which the second upper side weft and the third upper side weft approach to each other; and at positions sandwiching, in a machine direction, the second upper side weft and the third upper side weft at the separation portion, the first upper side weft and the adjacent fourth upper side weft are arranged to pass over a plurality of the upper side warps or warp binding yarns to form a crimp portion.

There is also provided the industrial two-layer fabric as described above, wherein the upper layer and the lower layer are woven with one warp binding yarn or weft binding yarn or a pair of two warp binding yarns or a pair of two weft binding yarns.

There is also provided the industrial two-layer fabric as described above, wherein the contiguously arranged three warps constituting the separation portion are any one of a combination of only upper side warps, a combination of only warp binding yarns, and a combination of upper side warp(s) and warp binding yarn(s).

There is also provided the industrial two-layer fabric as described above, wherein the upper side wefts are composed of repetition of the first upper side weft, the second upper side weft, the third upper side weft, and the fourth upper side weft which have been arranged contiguously.

There is also provided the industrial two-layer fabric as described above, wherein between the fourth upper side weft and the adjacent first upper side weft arranged subsequent thereto to the warp direction, one additional upper side weft or a plurality of additional upper side wefts are arranged.

The fabric of the invention is a two-layer fabric having, as constituent yarns, upper side warps to be woven with upper side wefts, lower side warps to be woven with lower side wefts, and binding yarns for weaving an upper layer and a lower layer. It is woven with one warp binding yarn or weft binding yarn, or a pair of two warp binding yarns or a pair of two weft binding yarns.

Between two wefts adjacent to each other, there is a separation portion in which they separate from each other and an approach portion in which they approach each other. These two wefts have therein a separation portion, a floating portion, an approach portion, a floating portion, and a separation portion in the order of mention. Thus they have both the separation portion and the approach portion.

The upper side wefts constituting the fabric of the invention have at least a first upper side weft, a second upper side weft, a third upper side weft, and a fourth upper side weft that are arranged contiguously. This order is repeated, for example, as follows: first, second, third, fourth, first, second, third, and fourth upper side wefts.

In the structure of the separation portion, each of three contiguously arranged warps form one-weft-long knuckles over the second upper side weft, over the third upper side weft, and over the second upper side weft, respectively, in the order of mention. At the separation portion, the second and third wefts are separated in a machine direction so that spaces for separation are necessary. It is therefore necessary to have the first and fourth upper side wefts form crimps of passing over a plurality of warps (at least three contiguously arranged warps above) to facilitate movement of the first upper side weft and the fourth upper side weft at places adjacent to the separation portion. The crimp portion does not interrupt widening of the second and the third upper side wefts for forming the separation portion, because it has no weaving position and therefore it helps the first and fourth upper side wefts move easily. To the contrary, if the first and fourth upper side wefts are woven at the both sides of the separation portion to form such as a plain weave design, firmly-woven warps and wefts interfere the transfer of the first and fourth upper side wefts and prevent widening of the second and third upper side wefts in a machine direction at the separation portion.

The second upper side weft has a design in which it passes under a first warp, over a second warp, and under a third warp at the separation portion. Although the second warp lies under a weft crimp, the two first and third warps are woven with the second upper side weft so that they tend to gather together, resulting in close contact of three warps constituting the separation portion.

On both sides of the separation portion, both the second upper side weft and the third upper side weft form a crimp passing over two or more warps on each side of the separation portion, thereby forming a floating portion adjacent to the separation portion. Then, adjacent to the floating portion, a design is formed in which one warp passes over the second upper side weft and the third upper side weft successively and one or two warps adjacent to the above-mentioned warp on one or both sides passes over either one of the second upper side weft or the third upper side weft. As a result, an approach portion is formed in which the second upper side weft and the third upper side weft approach each other.

The floating portions are necessary for facilitating the second and third upper side wefts, which have widened their space at the separation portion, to approach each other (to transfer) at the approach portion.

The fabric of the invention has thus a structure of a portion where two adjacent upper side wefts separate from each other and a portion where they approach to each other appear alternately.

The structure of three warps constituting the separation portion will next be described referring to FIG. 1. In the separation portion, knuckles of the first warp and the second warp are arranged in an oblique relation and knuckles of the second and the third warps are also arranged in an oblique relation. Due to repulsion between the knuckles, the second upper side weft and the third upper side weft tend to separate from each other.

As illustrated in FIG. 1, warps 5, 6 and, 7 form knuckles on the wefts 2, 3, and 2 in the order starting from the left. First, an action to gather the warps 5, 6, and 7 together will be described. The weft 3 is woven with the warp 5 and the warp 7 so that in spite of presence of the warp 6 therebetween, they gather together. The three warps therefore constitute a structure in which they have gathered together.

Next, an action to separate the weft 2 from the weft 3 will be described. Attention is paid to the intersections formed by four yarns, that is, wefts 2 and 3 and warps 5 and 6.

The warp 5 is pushed upward at a confounding portion where it passes over the weft 2 and forms a peak, while it forms a valley at confounding portions on both sides thereof where it passes under the wefts 1 and 3. The warp 6 is pushed upward at a confounding portion where it passes over the weft 3 and forms a peak, while it forms a valley at confounding portions on both sides thereof where it passes under the wefts 2 and 4. In such a manner, at four intersections made of two adjacent warps and two adjacent wefts, the warps and wefts are arranged upside down, whereby the warp at the valley moves to a direction away from the peak (in the direction of an arrow in FIG. 1). As a result, the knuckle of the warp 5 on the weft 2 moves downward in this drawing, while the knuckle of the warp 6 on the weft 3 moves upward in this drawing. They move so as to separate from each other and the wefts 2 and 3 woven with them also move to separate from each other.

Similarly, attention is paid to intersections of four yarns, that is, wefts 2 and 3 and warps 6 and 7. The warp 6 is pushed upward at a confounding portion where it passes over the weft 3 and forms a peak, while it forms a valley at confounding portions on both sides thereof where it passes under the wefts 2 and 4. The warp 7 is pushed upward at a confounding portion where it passes over the weft 2 and forms a peak, while it forms a valley at confounding portions on both sides thereof where it passes under the wefts 1 and 3. In such a manner, at four intersections made of two adjacent warps and two adjacent wefts, the warps and wefts are arranged upside down, whereby the warp at the valley moves to a direction away from the peak (in the direction of an arrow in FIG. 1). As a result, the knuckle of the warp 7 on the weft 2 moves downward in this drawing, while the knuckle of the warp 6 on the weft 3 moves upward in this drawing. They move so as to separate from each other and the wefts 2 and 3 woven with them also move to separate from each other.

As described above, a force acts to separate between the wefts 2 and 3 at two positions, that is, the warps 5 and 6 and the warps 6 and 7 so that the separation portion is formed. Moreover, there are the wefts 1 and 4 that form a long crimp on both sides in the separating direction. At weaving portions of warps and wefts, they are interwoven with each other so that transfer (or movement) does not occur easily. At a long crimp structure where warps and wefts are simply overlapped with each other, on the other hand, their transfer occurs relatively easily. When such an easily movable weft exists on the side to which the wefts 2 and 3 will move, the wefts 1 and 4 transfer in association with the movement of the wefts 2 and 3. As a result, the separation portion at which two wefts separate from each other is formed.

With regard to the term "long crimp" as used herein, the wefts 1 and 4 are required to have a design in which they pass over at least the warps 5, 6, and 7 constituting the separation portion in order to prevent formation of their knuckles on the warps constituting the separation portion.

Next, the contiguously arranged warps for constituting the separation portion in the fabric of the invention will be described. The contiguously arranged three warps are composed of, for example, one upper side warp and two warp binding yarns, which means one warp pair (a pair of an upper side warp and a lower side warp) and one warp binding yarn pair; two upper side warps and one warp binding yarn, which means two warp pairs and one warp binding yarn pair, or three upper side warps adjacent to each other, which means three warp pairs. When three warps have a warp binding yarn as one of constituent yarns, they may be two columns (one warp pair and one warp binding yarn or one warp binding pair) or three columns (two warp pairs and one war binding yarn pair, or three warp pairs) in a design diagram or in a repeating unit.

In the case of three warps composed of three warp pairs, the separation portion widens in the weft direction, causing a decrease in the length of the floating portion. In this case, a uniform and good dehydration property, which is an object of the invention, may sometimes be difficult to attain due to a decrease in the degree of separation and approach of wefts. This problem can however be overcome by increasing the length of the floating portion.

It is preferred to constitute the separation portion from three warps composed of two pairs, that is, a warp pair and a warp binding yarn pair or three warps composed of two warp binding pairs as illustrated in FIGS. 6A through 6F. FIGS. 6A and 6B show a pair of upper side warp u and a lower side warp d, and another pair of upper side warp u and a binding yarn B. FIG. 6C shows two pairs of an upper side warp and a binding yarn. FIGS. 6D and 6E show a pair of binding yarns and another pair of an upper side warp and a lower side warp. FIG. 6F shows a pair of upper side warp and a binding yarn and another pair of two binding yarns. In FIGS. 6D through 6F, the warp binding yarn (B) and another warp binding yarn (b) alternately form knuckles over either the second upper weft or the third upper weft. FIG. 6G shows three pairs of an upper side warp and a lower side warp. FIG. 6H shows three pairs of a binding yarn and a lower side warp. FIG. 6I shows two pairs of upper side warp and lower side warp and one pair of a binding yarn and a lower side warp. FIG. 6J shows two pairs of a warp binding yarn and a lower side warp, and one pair of an upper side warp and a lower side warp. It is to be noted that a bold frame in FIGS. 6A-6J indicates the site where the second warp knuckle (center knuckle) is located.

In order to form the separation portion and the approach portion successively from two wefts, it is necessary that the structure between them should be a floating portion having no weaving positions. At the floating portion, a weft is required to have a design in which it passes over two or more warps. The term "two or more warps" as used herein means two or more warp pairs.

As described above, the floating portion has a structure facilitating movement of yarns. A weaving position should not be formed between the separation portion having a wide space and the approach portion where yarns approach to each other in order to facilitate movement from the separation portion to the approach portion. Formation of this floating portion is a requirement for the formation of both the separation portion and the approach portion.

At the approach portion, there is a portion where one warp passes over both the second upper side weft and the third upper side weft so that they approach each other. A warp adjacent to the above-mentioned warp has a design in which it passes over either one of the second upper side weft or the third upper side weft. At a portion where a warp passes over one weft, the weft is drawn into the layer to decrease the height of the knuckle of the warp.

It cannot be denied that the approach portion becomes inferior in dehydration property and breathability because the number of yarns in the approach portion is greater than that in the separation portion. If yarns constituting the approach portion are different in height as in the invention, however, an oblique water drainage space is formed so that the dehydration property is not impaired even if the meshes on the surface are clogged.

The approach portion may employ a design in which one warp passes over the second upper side weft and the third upper side weft successively and another one warp adjacent to the above-mentioned warp on one side passes over one of the second upper side weft or the third upper side weft. FIGS. 5A through 5D show these examples wherein the warps are upper side warps. FIGS. 5K through 5R are also these examples wherein the warps are an upper side warp and a warp binding yarn. The approach portion may employ another design in which one warp passes over the second upper side weft and the third upper side weft successively and two warps adjacent to the above-mentioned warp on one side or both sides pass over one of the second upper side weft or the third upper side weft. FIGS. 5E through 5J show these examples. In particular, a design in which one warp passes over both the second upper side weft and the third upper side weft and a warp adjacent to the above-mentioned warp passes over either one of the second upper side weft or the third upper side weft is preferred (see FIGS. 5A-5D or FIGS. 5K-5R). An arrangement order at the approach portion may be selected freely. Warps constituting the approach portion may be either upper side warps or warp binding yarns.

As stated above, examples of the approach portion are illustrated in FIGS. 5A-5R. Similar to FIGS. 6A-6J, a mark "x" indicates that an upper side warp (u) lies over an upper side weft to form a knuckle; and a mark "♦" indicates that a warp binding yarn (B or b) lies over an upper side weft to form a knuckle. Thus, the approach portion may be formed of three warps. At a blank box, an upper side weft runs under a warp. No particular limitation is imposed on the design insofar as one warp passes over two wefts and other one or two warps form more knuckles over either one of the second upper side weft and the third upper side weft. The warp may be either an upper side warp (u) or a warp binding yarn (B or b).

Warps forming the upper layer of the fabric of the invention are upper side warps. In the case of a warp-binding triple weave, warp binding yarns as well as upper side warps serve as constituent yarns.

The upper layer and the lower layer are woven with one warp binding yarn or weft binding yarn, or a pair of two warp binding yarns or two weft binding yarns. At positions where an upper side warp and a lower side warp vertically overlap with each other, they form an upper/lower warp pair. When a warp binding yarn exists, it forms a warp binding yarn pair selected from a pair of two warp binding yarns, a pair of an upper side warp and a warp binding yarn, and a pair of a lower side warp and a warp binding yarn. Alternatively, the warp binding yarn may be placed singly without forming a pair.

In the fabric of the invention, the first upper side weft, the second upper side weft, the third upper side weft, and the fourth upper side weft are arranged contiguously. The second upper side weft and the third upper side weft are substantially yarns for constituting the separation portion and the approach portion, while the first upper side weft and the fourth upper side weft are yarns acting to form the separation portion. The presence of at least these four wefts enables the separation portion and the approach portion to form, but a fifth upper side weft or a plurality of upper side wefts may be arranged between the fourth upper side weft and a first upper side weft subsequent thereto. For example, a weft having a similar design to that of the fourth upper side weft or having a different design therefrom may be placed, as a fifth upper side weft, adjacent to the fourth upper side weft and these five upper side wefts are repeatedly arranged in the order of the first, second, third, fourth, fifth, first, second, third, fourth, and fifth upper side wefts.

Although no particular limitation is imposed on the lower side design, it is recommended to form lower side wefts having a long crimp structure as a countermeasure against wear. For example, a lower side weft may have a design in which it passes over two warps and passes under six warps to form a long crimp structure or a ribbed weave design in which two warps form a plain weave, while being laid in parallel.

Yarns to be used for the fabric of the invention may be selected depending on the fabric's purpose. Examples of them include, in addition to monofilaments, multifilaments, spun yarns, finished yarns subjected to crimping or bulking such as so-called textured yarn, bulky yarn and stretch yarn, and yarns obtained by intertwining them. As the cross-section of the yarn, not only circular form but also square or short form such as stellar form, or elliptical or hollow form can be used. The material of the yarn can be selected freely and usable examples of it include polyester, polyamide, polyphenylene sulfide, polyvinylidene fluoride, polypropylene, aramid, polyether ether ketone, polyethylene naphthalate, polytetrafluoroethylene, cotton, wool and metal. Of course, copolymer yarns, mixtures, or yarns obtained by incorporating various substances therein, depending on the material quality of them may also be used.

Various materials can be used for a papermaking wire. As upper side warps, lower side warps, warp binding yarns, and upper side wefts, it is usually preferred to use polyester monofilaments having rigidity and excellent size stability. As lower side wefts required to have wear resistance, those obtained by alternately arranging polyester monofilaments and polyamide filaments are preferred, because interweaving them is effective for improving wear resistance while maintaining rigidity. As the weft binding yarn, use of polyamide is effective for prevent internal wear.

With regard to the diameter of constituent yarns, upper side wefts have preferably a smaller diameter than lower side wefts from the standpoint of surface smoothness and fiber supporting property. The diameter of warps can be selected as needed. All the warps may have an equal diameter or the diameter of lower side warps may be made greater than that of the other warps. The diameter may be selected as needed.

Although the fabric of the invention has, in the cross direction, separation portions at which two adjacent wefts separate from each other and approach portions where they approach to each other alternately, employment of a structure having dehydration spaces in an oblique direction makes it possible to achieve a uniform dehydration property, a fiber supporting property, and surface smoothness throughout the fabric without clogging mesh openings.

BRIEF DESCRIPTION OF THE DRAWINGS

FIGS. 6A-6J are design diagrams illustrating a separation portion of the fabric according to the invention.

Figure 1:
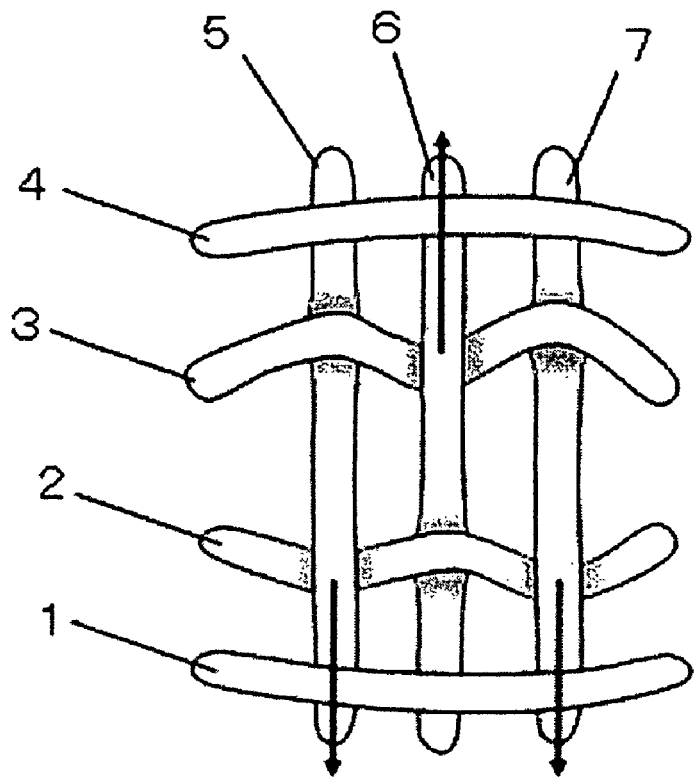
FIG. 1 is a schematic view illustrating a separation portion obtained by weaving first, second, third, and fourth upper side wefts and warps 5,6, and 7.

DESCRIPTION OF REFERENCE NUMERALS AND SIGNS 1u, 2u . . . upper side warp
2d, 4d . . . lower side warp
1B, 3B . . . warp binding yarn
1'u, 2'u . . . upper side weft
1'd, 3'd . . . lower side weft

DESCRIPTION OF THE PREFERRED EMBODIMENT

Embodiments of the invention will hereinafter be described referring to accompanying drawings.

Figure 2:
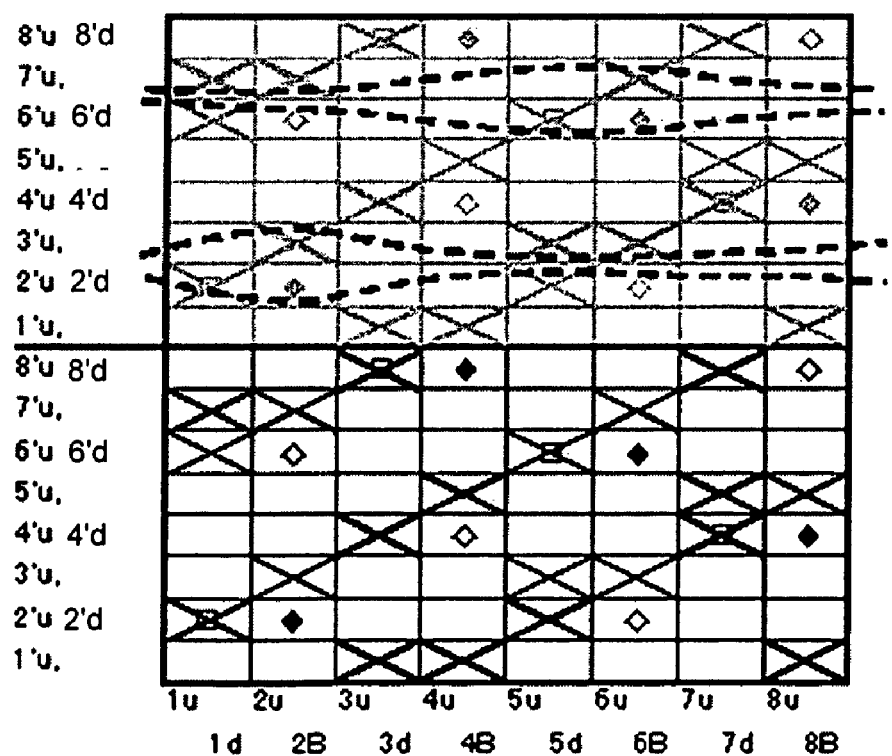
FIG. 2 is a design diagram illustrating the complete design or the repeating unit of Embodiment 1 according to the invention.
Figure 3:
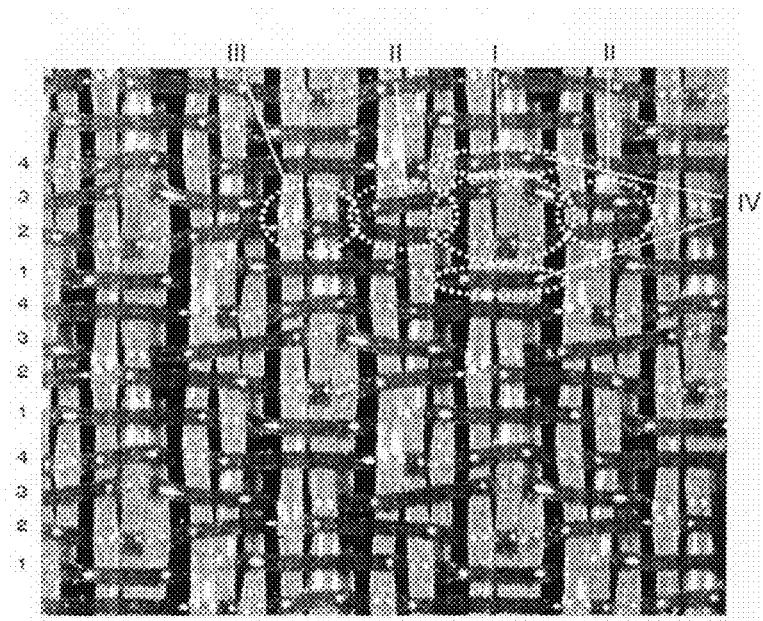
FIG. 3 is a photograph showing the upper side surface of FIG. 2.
Figure 4:
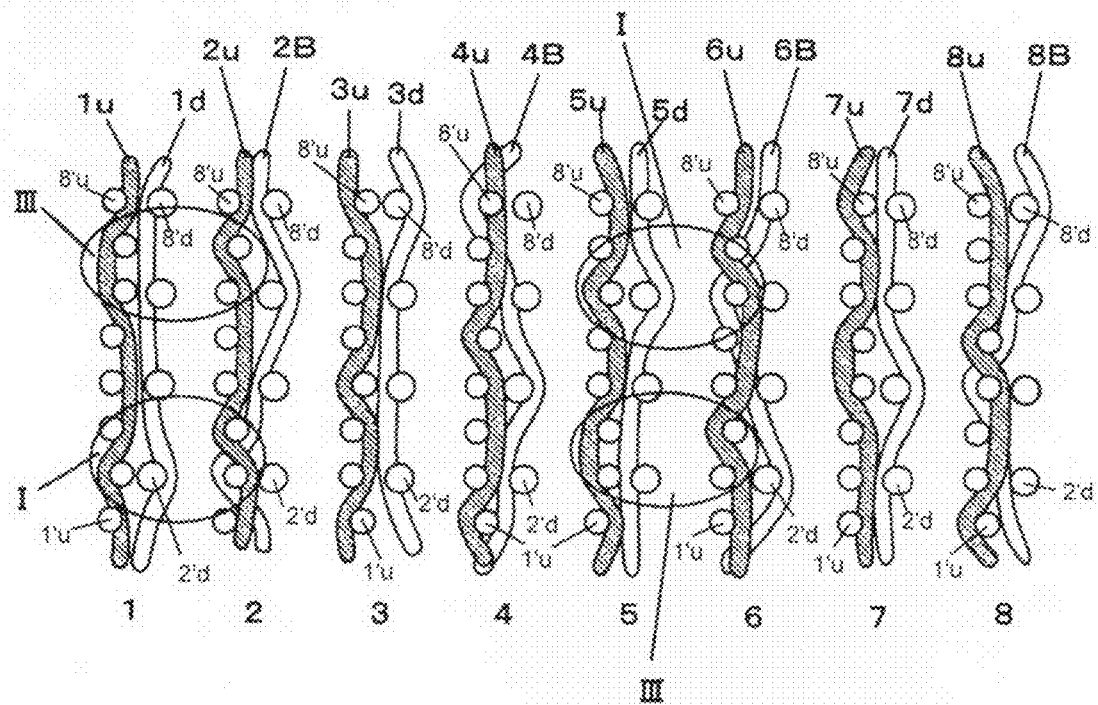
FIG. 4 is a cross-sectional view taken along a warp of the fabric according to the invention.
Figure 5A:
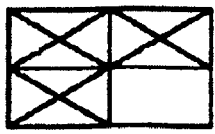
FIGS. 5A-5R are a design diagrams illustrating an example of the approach portion of the fabric according to the invention.
Figure 5B:
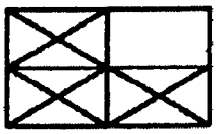
Figure 5C:
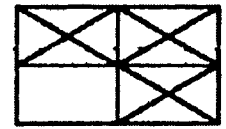
Figure 5D:
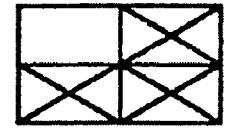
Figure 5E:
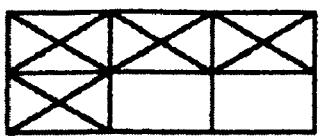
Figure 5F:
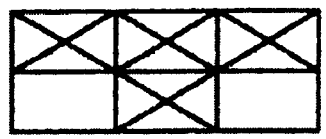
Figure 5G:
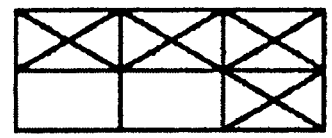
Figure 5H:
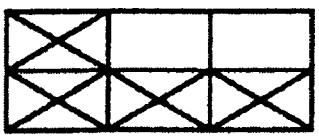
Figure 5I:
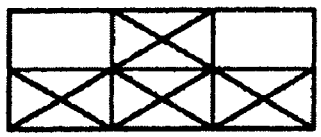
Figure 5J:
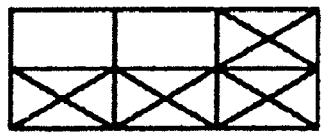
Figure 5K:
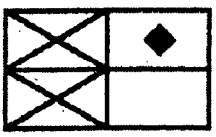
Figure 5L:
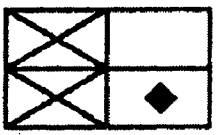
Figure 5M:
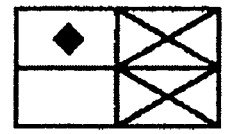
Figure 5N:
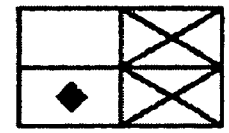
Figure 5O:
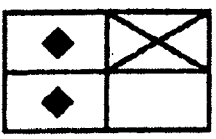
Figure 5P:
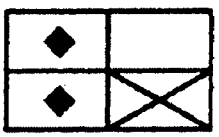
Figure 5Q:
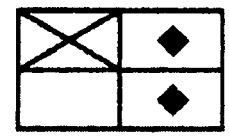
Figure 5R:
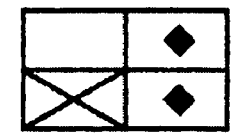

FIG. 1 is, as described above, a plan view illustrating the separation portion formed by weaving wefts 1, 2, 3, and 4, which are first, second, third, and fourth upper side wefts, with warps 5, 6, and 7. FIG. 2 is a view obtained by vertically connecting two design diagrams of the example of the invention. FIG. 3 is a photograph showing the upper side of the fabric obtained by weaving based on the design diagram of FIG. 2. FIG. 4 is a cross-sectional view of warps 1 to 8 illustrated in the design diagram of FIG. 2. FIGS. 5A-5R are design diagrams showing examples of the approach portion of the fabric of the invention; and FIGS. 6A-6J are design diagrams showing examples of the separation portion in the fabric of the invention.

The term "design diagram" as used herein means a minimum repeating unit of a weave pattern (which may also be called "complete design"). The whole weave pattern is formed by connecting this complete design longitudinally and latitudinally. In the design diagram, warps are indicated by Arabic numerals, for example 1, 2 and 3. Warp binding yarns for weaving upper and lower wefts are indicated by Arabic numerals with "B", upper side warps are indicated by Arabic numerals with "u", and lower side warps are indicated by Arabic numerals with "d". In the design diagram, warps with the same number form a pair. In FIG. 2, an upper side warp "u" and a warp binding yarn "B" or "b" constitute a warp binding yarn pair and an upper side warp "u" and a lower side warp "d" constitute an upper/lower warp pair.

Wefts are indicated by Arabic numerals with a prime, for example, 1', 2' and 3'. Upper side wefts and lower side wefts are arranged vertically but upper side wefts sometimes do not have lower side wefts thereunder, which depends on an arrangement ratio. Upper side wefts are indicated by Arabic numerals with "u" and lower side wefts are indicated by Arabic numerals with "d", for example 1'u, 2'd.

In these design diagrams, a mark "x" indicates that an upper side warp (u) lies over an upper side weft to form a knuckle; a mark "□" indicates that a lower side warp (d) lies under a lower side weft to form a knuckle. A mark "◆" indicates that a warp binding yarn (B) lies over an upper side weft to form a knuckle; and a mark "◇" indicates that the warp binding yarn (B) lies under a lower side weft to form a knuckle. A mark "▲" indicates that the warp binding yarn (b) lies over an upper side weft to form a knuckle.

In the design diagrams, yarns are vertically overlapped precisely. They are however illustrated as such for convenience of drawing and misalignment sometimes occurs in the actual fabric.

In FIGS. 3 and 4, the separation portion and the approach portion are marked to facilitate easy understanding, and I, II, III, and IV represent the separation portion, floating portion, approach portion, and crimp portion, respectively.

Embodiment 1

FIG. 2 is a design diagram of a fabric according to Embodiment 1 of the invention. It is a 16-shaft fabric in which warp binding yarn pairs (2, 4, 6, and 8) composed of upper side warps (u) and warp binding yarns (B) and warp pairs (1, 3, 5, and 7) composed of upper side warps (u) and lower side warps (d) are arranged alternately. An arrangement ratio of upper side wefts and lower side wefts is 2:1.

FIG. 2 is obtained by vertically connecting two design diagrams to each other and in the upper portion thereof, actual behaviors of wefts constituting the separation portion and the approach portion are indicated by a dotted line. The first, second, third, and fourth upper side wefts are illustrated in the photograph of FIG. 3 showing the upper surface and the separation portion I, floating portion II, approach portion III, and crimp portion IV are indicated by dotted lines, respectively.

In this embodiment, the contiguously arranged warps constituting the separation portion are, in the case of wefts 2'u and 3'u illustrated in the design diagram of FIG. 2, an upper side warp 1u, an upper side warp 2u, and a warp binding yarn 2B which are composed of a warp pair 1 and a warp binding yarn pair 2 and the first, second, third, and fourth upper side wefts are indicated by 1'u, 2'u, 3'u, and 4'u and 5'u, 6'u, 7'u, and 8'u, respectively.

With regard to the weft 2'u and 3'u, the three contiguously arranged yarns, that is, the upper side warp 1u, the upper side warp 2u, and the warp binding yarn 2B, in the separation portion (I of FIG. 3), form knuckles corresponding to one weft on the second upper side weft 2u', the third upper side weft 3'u, and the second upper side weft 2'u in the order of mention, respectively. The first upper side weft 1'u and the fourth upper side weft 4'u which are placed on both sides of the second upper side weft 2'u and the third upper side weft 3'u so as to sandwich them pass over a plurality of warps to form a crimp portion (IV of FIG. 3) without being woven with warps constituting the separation portion.

In the separation portion, the second and third upper side wefts 2'u and 3' widen their distance so that a space for widening on both sides is necessary. The first upper side weft and the fourth upper side weft have therefore a design in which they form a crimp passing over a plurality of warps to facilitate movement to form a space in regions adjacent to the separation portion. In the crimp portion without weaving positions, wefts move easily. It does not prevent the second and third upper side wefts from widening their space.

On both sides of the separation portion, the second upper side weft and the third upper side weft form a floating portion passing over the warps 2 and 4, while being laid in parallel (II of FIG. 3). Similar to the crimp portion, the floating portion has no weaving position and facilitates movement therein, which enables easy movement from the widened position of the separation portion to the gathered position of the approach portion.

The approach portion (III of FIG. 3) is formed between these two floating portions. With regard to the upper side wefts 2u and 3'u, an upper side warp 5u passes over the upper side wefts 2'u and 3'u successively and an upper side warp 6u adjacent thereto passes over only the upper side weft 3'u.

The upper side warp 5u passes over both the upper side wefts 2'u and 3'u so that they gather into one. In a portion where the upper side warp 6u passes over the upper side weft 3'u, only the upper side weft 3'u is withdrawn further into the layer and is positioned lower than the knuckle of the upper side warp 5u.

It cannot be denied that a portion where yarns approach to each other such as the approach portion is inferior in dehydration property and breathability to a portion where yarns have a large mesh opening as in the separation portion. A difference in height among knuckles constituting the approach portion as in the invention does not inhibit the dehydration property because an oblique water channel is formed.

In the lower side, a lower side weft has a design in which it passes over one warp, under four warps, over one warp, and then under two warps. In the present embodiment, on the lower surface side, warp binding yarns function and form a design similarly to lower side warps.

What is claimed is:

1. An industrial two-layer fabric comprising:
 upper side warps that are woven with upper side wefts configured to constitute an upper layer;
 lower side warps that are woven with lower side wefts configured to constitute an lower layer; and
 binding yarns that weave the upper layer and the lower layer, the binding yarns being either warp binding yarns or weft binding yarns, wherein:
 a first upper side weft, a second upper side weft, a third upper side weft, and a fourth upper side weft are arranged contiguously and repeatedly;
 the second upper side weft and the third upper side weft form a separation portion, a floating portion and an approach portion;
 each of the first upper side weft and the fourth upper side weft form a crimp portion;
 at the separation portion, each of a first set of three contiguously arranged warps, that include the upper side warp or the warp binding yarn, or alternatively the upper side warp and the warp binding yarn, forms a one weft long knuckle over the second upper side weft, a one weft long knuckle over the third upper side weft, and a one weft long knuckle over the second upper side weft, respectively whereby the second upper side weft is separated from the third upper side weft;

at the floating portion, the second upper side weft and the third upper side weft are arranged to pass over a second set of two or more warps that include the upper side warp or the warp binding yarn, or alternatively the upper side warp and the warp binding yarn, two of the second sets of warps are arranged adjacent to both sides of the first set of the warps to form two floating portions at both sides of the separation portion;

at the approach portion, which is arranged adjacent to and between the two floating portions, a first one of a third set of warps, which is either an upper side weft or a warp binding yarn, passes over the second upper side weft and the third upper side weft successively and a second one or two of the third set of warps arranged adjacent to the first one of the third set of warps pass over either one of the second upper side weft or the third upper side weft so that the second upper side weft and the third upper side weft approach to each other; and at the crimp portion, each of the first upper side weft and the fourth upper side weft passes over at least the first set of warps, the crimp portions formed by the first and fourth upper side wefts sandwich the separation portion.

2. The industrial two-layer fabric according to claim 1, wherein, in a repeating unit, the upper layer and the lower layer are woven with one selected from a group consisting of one warp binding yarn, one weft binding yarn, a pair of warp binding yarns and a pair of weft binding yarns.

3. The industrial two-layer fabric according to claim 1, wherein the three warps of the first set of warps at the separation portion are any one of a combination of only upper side warps, a combination of only warp binding yarns, and a combination of an upper side warp or upper side warps and a warp binding yarn or warp binding yarns.

4. The industrial two-layer fabric according to any one of claims 1, wherein the upper side wefts are composed of repetition of the first upper side weft, the second upper side weft, the third upper side weft, and the fourth upper side weft which are arranged contiguously.

5. The industrial two-layer fabric according to any one of claims 1, wherein between the fourth upper side weft and the first upper side weft arranged subsequent thereto in a warp direction, a fifth upper side weft or a plurality of the fifth upper side wefts are arranged.

* * * * *